United States Patent

[11] 3,595,393

[72] Inventors Matthew A. Messa
Cedarbrook Hills Apts. Bldg. 1, Apt. #604, Wyncote, Pa. 19095;
David Brown, Lansdale, Pa.
[21] Appl. No. 760,867
[22] Filed Sept. 19, 1968
[45] Patented July 27, 1971
[73] Assignee Matthew A. Messa
Wyncote, Pa.
by said David Brown

[54] WASTE WATER TREATMENT SYSTEM
13 Claims, 8 Drawing Figs.
[52] U.S. Cl. .................................... 210/103, 210/202, 210/206, 210/256
[51] Int. Cl. .................................... B01d 21/01, B01d 23/14
[50] Field of Search .................................... 210/13, 20, 46, 199, 202, 203, 205, 206, 256, 103

[56] References Cited
UNITED STATES PATENTS
| | | | |
|---|---|---|---|
| 2,005,950 | 6/1935 | Moroney et al. | 210/205 X |
| 2,245,587 | 6/1941 | Hughes | 210/46 |
| 3,408,288 | 10/1968 | Messa | 210/202 X |
| 3,429,442 | 2/1969 | Mackrle et al. | 210/202 |

Primary Examiner—Samih N. Zaharna
Attorney—Seidel and Gonda

ABSTRACT: A waste water treatment system is disclosed wherein water to be treated is processed to remove turbidity, solids, organics, surfactants, colloidal suspensions, detergents, etc. An upflow clarifier is partially surrounded by a filter chamber, an adsorption chamber, and a storage chamber. The water to be treated is mixed with a dry coagulant which forms a floc blanket in the upflow clarifier. Detection means are provided to limit the upper limit of the floc blanket and partially withdraw the contents of the clarifier when the floc blanket rises above a predetermined level.

PATENTED JUL 27 1971

INVENTORS
MATTHEW A. MESSA
DAVID BROWN

BY
Seidel & Gonda
ATTORNEYS.

INVENTORS.
MATTHEW A. MESSA
DAVID BROWN
BY
Seidel & Gonda
ATTORNEYS.

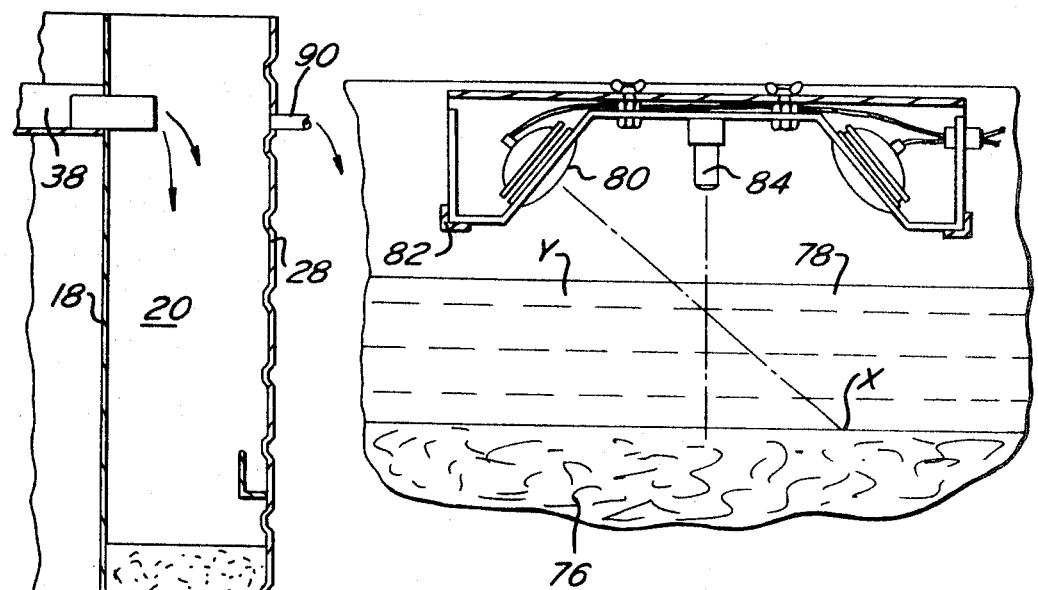
FIG. 5
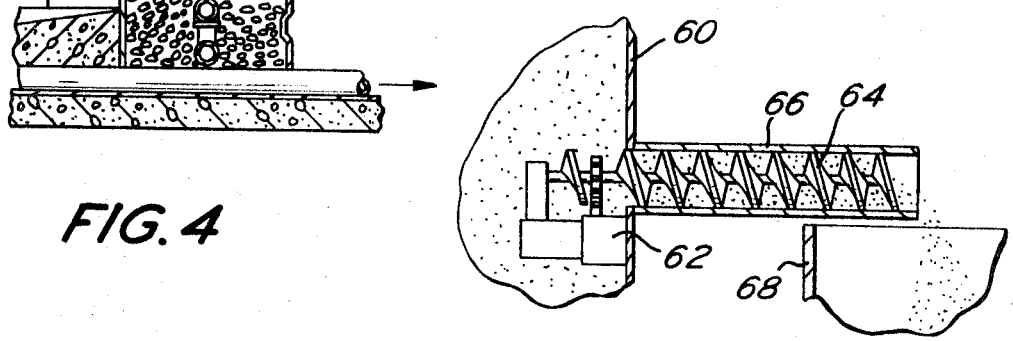
FIG. 6
FIG. 4

WASTE WATER TREATMENT SYSTEM

This invention relates principally to a waste water treatment system for use with laundromats but may be used in conjunction with other systems such as commercial car washing establishments, etc. The present invention will enable such commercial activities to purify the water that they normally discharge into sewers or discharge into rivers and streams. As part of the increasing concern for pollution evident in recent years, it has become more and more necessary for commercial establishments which are large users of water to refrain from directly discharging their untreated waste water into streams, sewers, and the like. In addition to solving this problem, in certain instances the present invention may enable such establishments to reuse the treated water and thereby substantially reduce the amount of water they would normally utilize.

In accordance with the present invention, an upflow clarifier is partially surrounded by a filter chamber, an adsorption chamber, and a holding or storage chamber known as a clearwell. A coagulant is mixed in dry form with the water to be treated and delivered to the bottom of the upflow clarifier. The coagulant forms a floc blanket in the upflow clarifier. Detection means are provided for detecting the level of the floc blanket and limiting the uppermost level which the floc blanket can attain. When the floc blanket rises above a predetermined level, means are activated for partially withdrawing the contents of the floc blanket. The last-mentioned means may include a pump for withdrawing the contents of the clarifier for a period such as one minute. This will substantially lower the level of the clarifier.

It is an object of the present invention to provide a novel waste water treatment system.

It is another object of the present invention to provide a waste water treatment system which will produce a stable, odor-free, low organic content effluent.

It is another object of the present invention to provide a waste water treatment system which is designed to utilize dry chemical additives which can be premixed for use by the operator of a car wash, laundry, etc.

It is another object of the present invention to provide a waste water treatment system having a sensing device for detecting the upper limit of the floc blanket.

It is another object of the present invention to provide a waste water treatment system which is constructed and arranged in a manner so as to provide for maximum utilization of space, while providing a system which is reliable and is automatic while requiring little or no maintenance, and simple operating procedures.

Other objects will appear hereinafter.

For the purpose of illustrating the invention, there is shown in the drawings a form which is presently preferred; it being understood, however, that this invention is not limited to the precise arrangements and instrumentalities shown.

FIG. 4 is a sectional view taken along the line 4-4 in FIG. 2.

FIG. 5 is a sectional view taken along the line 5-5 in FIG. 2.

FIG. 6 is a sectional view taken along the line 6-6 in FIG. 2.

Figure 1:
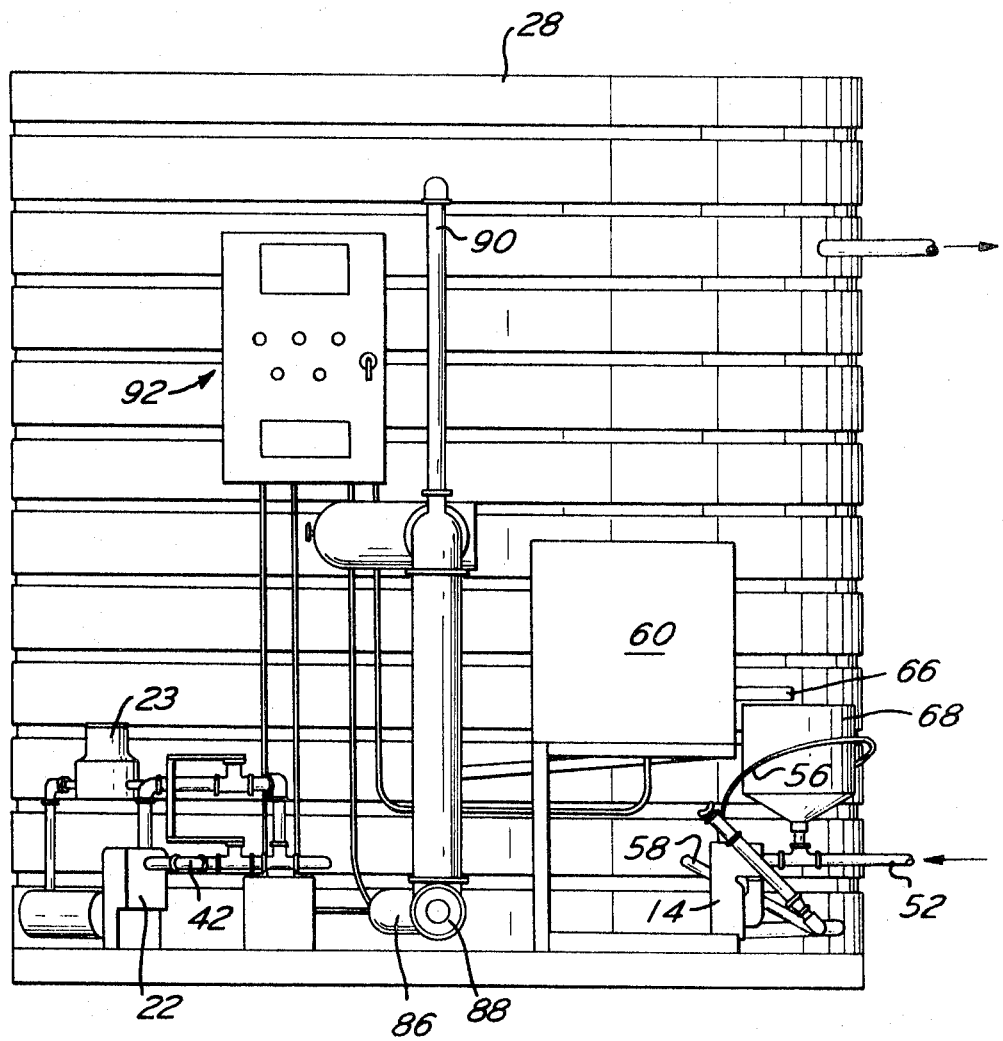
FIG. 1 is a front elevation view of apparatus in accordance with the present invention.
Figure 7:
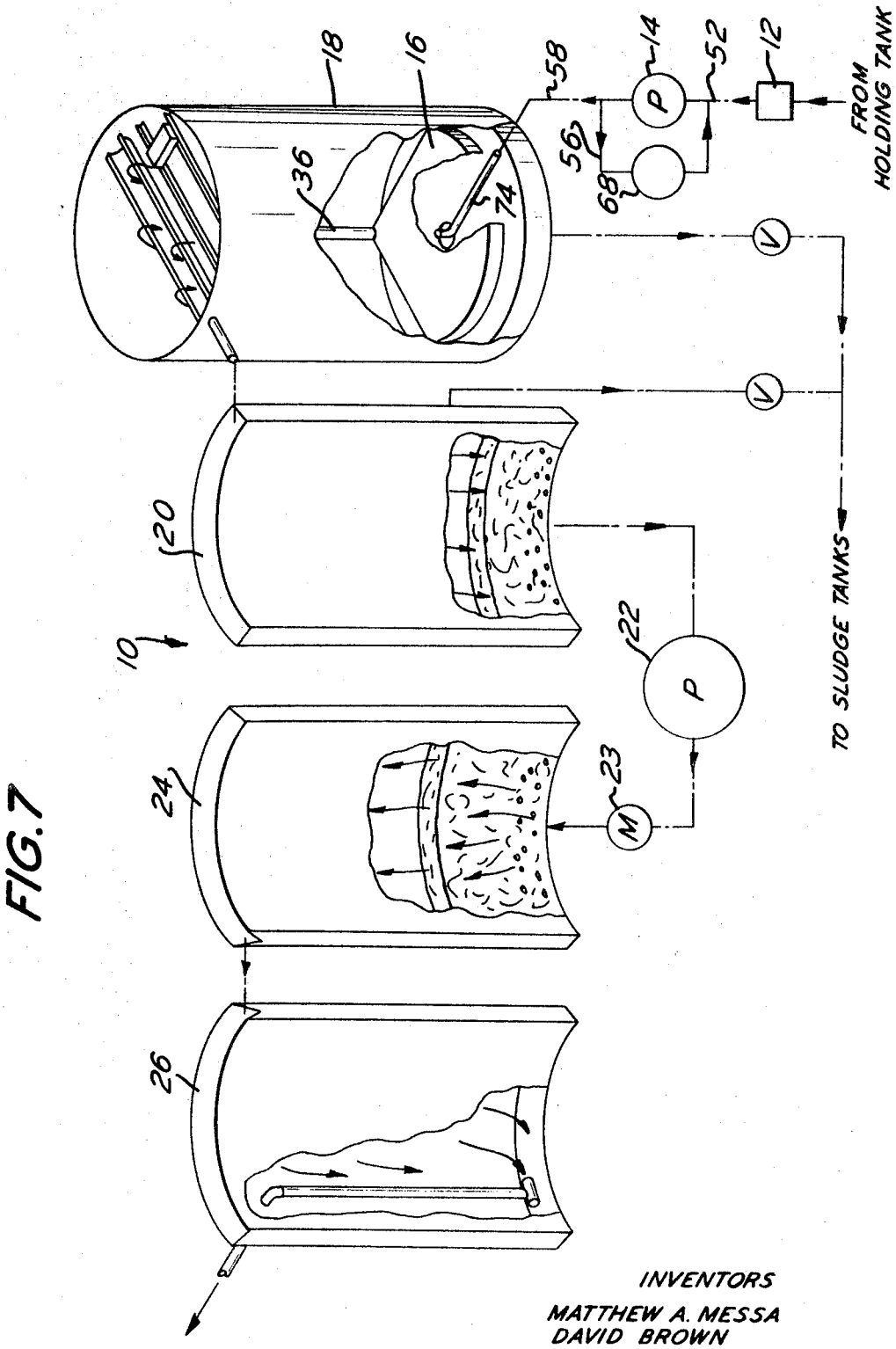
FIG. 7 is a diagrammatic flow diagram.

Referring to the drawing in detail, wherein like numerals indicate like elements, there is shown in FIG. 1 apparatus in accordance with the present invention designated generally as 10. Referring initially to FIG. 7, it will be seen that the apparatus 10 includes a system wherein water to be treated is delivered from a holding tank through a lint filter 12 to a pump 14. From the pump 14, the water to be treated is delivered to the bottom of an inverted mixing cone 16 in an upflow clarifier having a housing 18. From the top of the upflow clarifier, the water to be treated flows downwardly through a filter chamber 20 to the inlet side of a pump 22. Pump 22 discharges the water to be treated upwardly through the adsorption chamber 24. From the top of the adsorption chamber 24, the water flows into a storage chamber 26.

Figure 2:
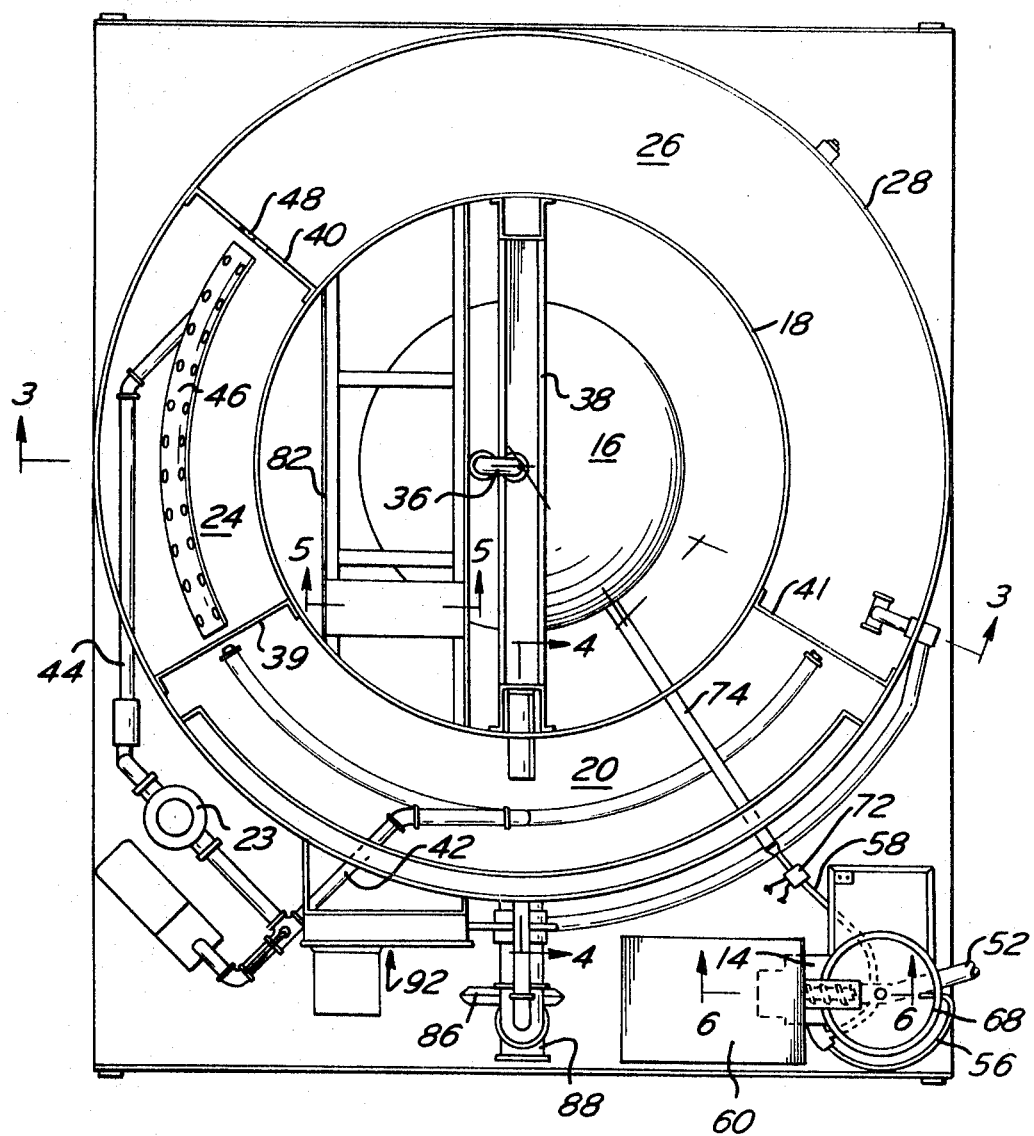
FIG. 2 is a top plan view of the apparatus shown in FIG. 1.

As will be apparent from FIG. 2, the chambers 20, 24, and 26 each partially surround the housing 18 of the upflow clarifier. The chambers are surrounded by an outer housing 28. The housings 18 and 28 are mounted on a common base 30. Within housing 18, there is provided a bottom wall which tapers to a centrally disposed passage 34. The apex of the cone 16 communicates with an overflow weir-trough 38 by means of a vent pipe 36.

As shown more clearly in FIG. 2, the chambers 20, 24 and 26 are defined by radially outwardly extending partitions 39, 40 and 41. The partitions extend between walls 18 and 28. Within filter chamber 20, there is provided a filter medium in the form of partially spent activated carbon. In its preferred embodiment, there is provided 900 pounds of activated carbon having 10 square feet of filter area within chamber 20. The filter material removes soluble organics remaining after coagulation and clarification, but primarily will remove residual solids.

The filtered water collects in a manifold at the bottom of chamber 20 and is removed therefrom by way of a conduit 42 connected to the inlet side of the pump 22. The outlet side of the pump 22 is connected to conduit 44 by way of a water meter 23. Conduit 44 is connected to a discharge manifold 46 at the bottom of chamber 24 and causes the water to pass upwardly through the adsorption chamber 24. Chamber 24 is preferably provided with 900 pounds of activated charcoal which is cleaner or fresher than the activated charcoal used in chamber 20. After the charcoal is used for a predetermined period of time in chamber 24, it is transferred to chamber 20. The activated carbon in chamber 24 preferably has approximately 5 square feet of surface area. The filtered water from chamber 24 overflows through a port 48 in partition 40 and is stored in chamber 26 until it is withdrawn for disposal or reuse through conduit 50.

Water to be treated enters through the inlet pipe 52 to the suction side of a pump 14. The output from the pump 14 is split into two branch conduits, 56 and 58. Conduit 58 is a flexible plastic pipe which communicates with the upflow clarifier. Conduit 56 is a flexible plastic pipe which communicates with the mixing chamber 68.

Figure 8:
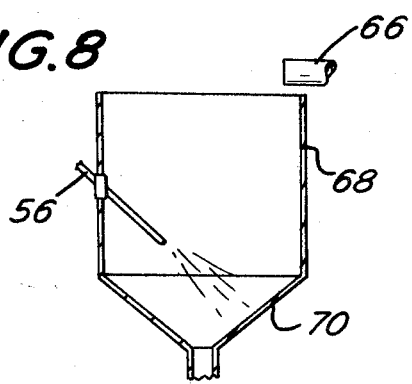
FIG. 8 is a sectional view of the mixing chamber shown in FIGS. 1 and 2.

A chemical storage hopper 60 is provided. Within the hopper 60, there is a dry blend of coagulant premixed for use by the operator. See FIG. 6. A motor 62 in chamber 60 rotates a screw 64 in discharge conduit 66 for selectively feeding the coagulant to the mixing chamber 68. As shown more clearly in FIG. 8, the discharge from conduit 56 impinges upon a conical wall 70 in the bottom of chamber 68 at the area where the coagulant is discharged from conduit 66 so as to obtain a complete dispersion. The mixture of coagulant and water discharges from chamber 68 by way of a discharge port at the bottom which communicates directly with the inlet conduit 52. Hence, the preblended water and coagulant is caused to pass through the rotary pump 14 for a further blending before it is delivered to the upflow clarifier. A pressure switch 72 in conduit 58 operates the motor 62 when the pressure in conduit 58 is sufficiently high. This prevents delivery of dry coagulant to the chamber 68 when there is no water delivered thereto from conduit 56.

The plastic conduit 58 extends through a pipe 74 so that the coagulant water may be delivered into the inverted cone 16 in the upflow clarifier. The coagulant forms a suspended floc blanket 76 within the upflow clarifier. The level of the floc blanket 76 is continuously monitored by a detecting device shown more clearly in FIG 5.

The detecting device includes a pair of lamps 80 and a photoelectric cell 84 mounted on a framework 82. There will generally always be a layer of water 78 above the floc blanket 76. Only one of the lamps 80 will be operative at any one time, the other being a spare. The light beam from lamp 80 projects through the layer of water 78 and reflects off the upper surface of the floc blanket 76 at location X. As the level of the floc blanket rises, location X moves closer and closer to the longitudinal axis of cell 84. When the floc blanket reaches the level Y, location X will be directly below cell 84 and thereby cause the reflection to activate cell 84.

Figure 3:
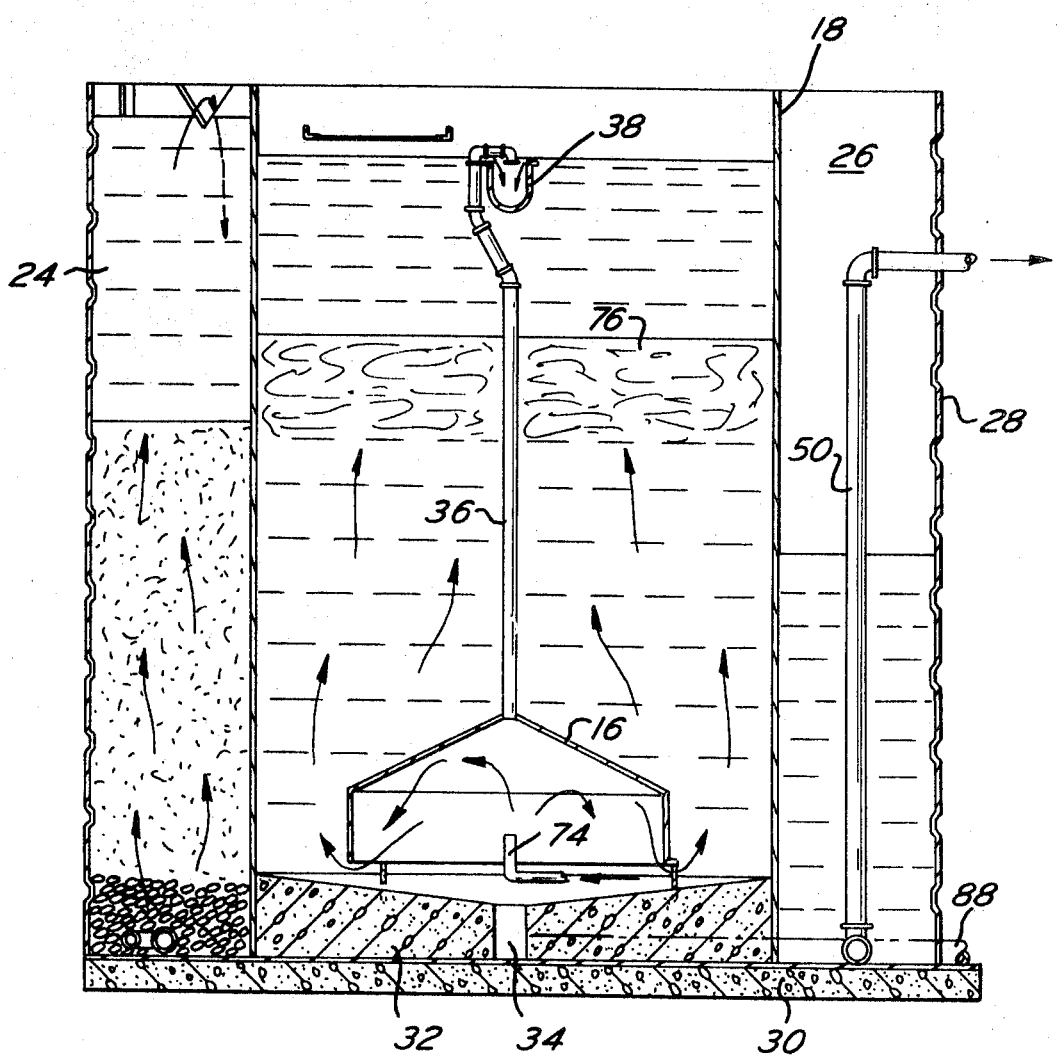
FIG. 3 is a sectional view taken along the line 3-3 in FIG. 2.

Cell 84 is coupled by wires, not shown, to an electrically operated valve 86 in drain conduit 88. See FIGS. 1—3. Drain conduit 88 communicates with passage 34. When valve 86 is open, a portion of the contents of the upflow clarifier are discharged through conduit 88. The closing of valve 86 is controlled by a timer. When the timer closes, valve 86 will close. Valve 86 is preferably set to remain open for a period of about one minute. During this time period, a sufficient quantity of the floc blanket will be discharged through conduit 88 so as to substantially lower the level of floc blanket 76.

Drain conduit 88 communicates with the upper end of the storage chamber 20 by way of conduit 90. Conduit 90 communicates with conduit 88 on the discharge side of valve 86 so that if the water level in chamber 20 rises above the level of conduit 90's connection to chamber 20, it will overflow through conduit 90 and conduit 88. A control panel 92 is provided on the housing 28 with appropriate switches and dials relating to the various components of the system.

The operation of the system 10 is as follows:

Water to be treated is pumped from a holding tank by pump 14 to the upflow clarifier defined by housing 18 which is open at the top and closed at the bottom by the bottom wall 32. When the pressure in the pump outlet conduit 58 is sufficient high, pressure switch 72 will start the motor 62 in the chemical storage hopper 60. A minor portion of the pumped water flows through conduit 56 into the chamber 68 wherein it mixes with the dry coagulant fed by screw 64. The mixture discharges through the port at the bottom of the blending chamber 68 to the inlet side of the pump 14.

The mixture is delivered to the bottom of the clarifier and flows upwardly therein. The coagulant forms the floc blanket 76. The water is coagulated as it moves upwardly through the floc blanket which removes suspended solids, particles having a size less than 25 microns, turbidity, surfactants, organics, phosphate, and reduces the waste water BOD and COD.

The effluent 78 above the floc blanket 76 flows into the weir-trough 38 and discharges into the top of the filter chamber 20. The effluent flows downwardly through the carbon filter bed in chamber 20 to the bottom thereof due to gravity and a slight suction due to pump 22. The pump 22 pumps the filtered water upwardly through the activated carbon in adsorption chamber 24. The water overflows from the top of chamber 24 into the storage chamber 26 wherein it is stored for filter backwash. If desired or required by municipal authorities, chlorine or other disinfectants may be added to the water while it is in chamber 26.

As the level of the floc blanket 76 rises, the reflection on blanket 76 at location X moves closer to the centerline of the cell 84 until the reflection intersects the axis of cell 84 at elevation Y. The reflection at the interface between blanket 76 and effluent 78 triggers cell 84 which opens valve 86 and starts a timer. When the timer closes, the valve 86 closes. While the timer and valve 86 are open, a portion of the contents of the clarifier discharge through conduit 88 to a tank wherein the coagulant may be removed for reprocessing. Such discharge lowers the level of the floc blanket 76 so that the reflection of the light beam from lamp 80 is at a location spaced from the axis of cell 84 such as location X. At all times, pumps 14 and 22 continue to operate. The entire system is continuous and automatic.

When the MBAS concentration of the effluent in chamber 26 exceeds that required by regulatory agencies, the system may be shut down. Thereafter, the activated carbon from chamber 20 is removed. The activated carbon from chamber 24 is placed in chamber 20 and fresh activated carbon is placed in chamber 24. Thereafter, the operation of the system may be resumed.

The coagulant in chemical storage hopper 60 is in dry form and may include alum (aluminum sulfate), ferric chloride, ferric sulfate, lime, chlorine, clays, organic polyelectrolytes, etc., or combinations thereof. It will be noted that the system 10 is ready for installation in almost any location. No expensive supports or underground locations are required. If desired, the entire system may be mounted on a a vehicle for ease of mobility and movement from one area to another.

The present invention may be embodied in other specific forms without departing from the spirit or essential attributes thereof and, accordingly, reference should be made to the appended claims, rather than to the foregoing specification as indicating the scope of the invention.

We claim:

1. Water-treating apparatus comprising a first chamber disposed in an upright position defining an upflow clarifier, said chamber having an inlet conduit at its lower end and an outlet conduit at its upper end, means for feeding a mixture of water to be treated and a coagulant into said inlet conduit of said first chamber, a second chamber disposed in upright position, said second chamber containing means for filtering water and having an inlet conduit at its upper end and an outlet conduit at its lower end, said outlet of said first chamber being connected to the inlet of said second chamber, a third chamber disposed in upright position, said third chamber containing adsorbtion material and having an inlet conduit at its lower end and an outlet at its upper end, pumping means connected to said outlet of said second chamber and said inlet of said third chamber so that water will be pumped from the lower end of said second chamber upwardly through said third chamber, a fourth chamber disposed in upright position, said fourth chamber having an inlet at its upper end and an outlet, said outlet of said third chamber being connected to said inlet of said fourth chamber so that liquid treated in said first three chambers can be stored in said fourth chamber, and means for limiting the upper level of a floc blanket in said first chamber.

2. Apparatus in accordance with claim 1 wherein said means for limiting the upper limit of the floc blanket includes a level detector, and a valved drain conduit through which the contents of said clarifier may be removed when the floc blanket rises above a predetermined level, the valve in said drain conduit being responsive to said detector.

3. Apparatus in accordance with claim 1 wherein said last-mentioned means includes a lamp projecting a light beam at an angle with respect to the vertical, a photocell responsive to reflection of said light beam from the upper surface of said blanket when the level of the floc blanket reaches a predetermined level.

4. Apparatus in accordance with claim 1 wherein said feeding means includes a blending chamber, a pump having its inlet communicating with a discharge port of said chamber, the outlet of said pump communicating with said clarifier and said chamber, and means for feeding a dry coagulant into said chamber.

5. Apparatus in accordance with claim 4 wherein said coagulant feeding means includes a supply hopper, a motor for causing delivery of powdered coagulant from the supply hopper to the chamber, and a switch responsive to the pump outlet for controlling operation of said motor.

6. Apparatus in accordance with claim 4 wherein said pump outlet communicates with the clarifier by a flexible plastic conduit.

7. Water-treating apparatus comprising an upflow clarifier, a downflow filter chamber containing filtering means, said filter chamber partially surrounding said clarifier and having its upper end communicating with the upper end of said clarifier, an upflow adsorbtion chamber containing adsorbtion means, said adsorbtion chamber partially surrounding said clarifier, pumping means for pumping water from the bottom of said downflow filter chamber upwardly through said adsorption chamber, a clearwell chamber communicating with the upper end of said adsorbtion chamber, means for feeding a mixture of water to be treated and coagulant into the bottom of said clarifier, said feeding means including a blending chamber and a pump, said blending chamber having an inlet port and a discharge port, said pump having its inlet communicating with said discharge port of said blending chamber and its outlet communicating with said clarifier and said inlet port of said blending chamber, means for feeding a dry coagulant into said blending chamber, said dry coagulant feeding means including a supply hopper and a motor for causing delivery of said dry coagulant from said supply hopper to said blending chamber, a switch responsive to the pressure in said pump outlet for controlling operation of said motor, and means for limiting the upper level of a floc blanket in said clarifier.

8. Water-treating apparatus comprising an upflow clarifier, a downflow filter chamber containing filtering means, said filter chamber partially surrounding said clarifier and having its upper end communicating with the upper end of said clarifier, an upflow adsorbtion chamber containing adsorbtion means, said adsorbtion chamber partially surrounding said clarifier, pumping means for pumping water from the bottom of said downflow filter chamber upwardly through said adsorbtion chamber, a clearwell chamber communicating with the upper end of said adsorbtion chamber, means for feeding a mixture of water to be treated and coagulant into the bottom of said clarifier, said feeding means including a blending chamber and a pump, said blending chamber having an inlet port and a discharge port, said pump having its inlet communicating with said discharge port of said blending chamber and its outlet communicating with said clarifier and said inlet port of said chamber, means for feeding a dry coagulant into said blending chamber, said pump outlet communicating with said clarifier by a flexible plastic conduit, and means for limiting the upper level of a floc blanket in said clarifier.

9. Water-treating apparatus comprising a first chamber disposed in an upright position defining an upflow clarifier, said chamber having an inlet conduit at its lower end and an outlet conduit at its upper end, a pump having an inlet and an outlet, a blending chamber having an inlet and an outlet, motor means for feeding a dry coagulant to said blending chamber, said pump outlet being connected to said inlet of said clarifier and said inlet of said blending chamber so that portions of the outlet of said pump flow to both said clarifier and said blending chamber whereby said dry coagulant is mixed with water from said pump outlet, and means for limiting the upper level of the floc blanket in said clarifier.

10. Apparatus in accordance with claim 9 wherein said means for limiting the upper level of said floc blanket include a floc blanket detector and an outlet at the lower end of said clarifier, said outlet at said lower end comprising a drain conduit and a valve, said valve in said drain conduit being responsive to detection of a floc blanket by said detector to open thereby removing the contents of said clarifier through said drain conduit at the lower end of said clarifier without altering said floc blanket when its upper level rises above a predetermined level.

11. Apparatus in accordance with claim 10 wherein said floc blanket detector is disposed above the floc blanket and includes means for projecting a beam onto said floc blanket and means for sensing the presence of said beam on a predetermined portion of said floc blanket to open said drain valve.

12. Apparatus in accordance with claim 10 wherein said detector includes a lamp projecting a light beam at an acute angle with respect to the vertical, and a downwardly directed photocell responsive to reflection of said light beam on the upper surface of said blanket.

13. Apparatus in accordance with claim 9 wherein the portion of the pump outlet communicating the pump with the upflow clarifier is at least in part a flexible plastic conduit containing a pressure switch, and said motor means being responsive to said pressure switch whereby the motor means is operative only when a predetermined discharge pressure is present in said flexible conduit.